US012789435B2

(12) United States Patent
Al-Bayati et al.

(10) Patent No.: US 12,789,435 B2
(45) Date of Patent: Nov. 10, 2026

(54) PROCESS FOR MANUFACTURING A WATER-SOLUBLE SHEET

(71) Applicant: Reckitt Benckiser Finish B.V., Schiphol (NL)

(72) Inventors: Alias Younis Al-Bayati, Heidelberg (DE); Sascha Fuhrmann, Heidelberg (DE); Torsten Roth, Heidelberg (DE); Jan Maurycy Uszko, Heidelberg (DE)

(73) Assignee: Reckitt Benckiser Finish B.V., Schiphol (NL)

( * ) Notice: Subject to any disclaimer, the term of this patent is extended or adjusted under 35 U.S.C. 154(b) by 0 days.

(21) Appl. No.: 18/847,391

(22) PCT Filed: Mar. 1, 2023

(86) PCT No.: PCT/EP2023/055192

§ 371 (c)(1),
(2) Date: Sep. 16, 2024

(87) PCT Pub. No.: WO2023/174695

PCT Pub. Date: Sep. 21, 2023

(65) Prior Publication Data

US 2025/0196418 A1 Jun. 19, 2025

(30) Foreign Application Priority Data

Mar. 17, 2022 (GB) ...................................... 2203720

(51) Int. Cl.
*B29C 48/00* (2019.01)
*B29K 29/00* (2006.01)
*B29L 31/00* (2006.01)

(52) U.S. Cl.
CPC ........ *B29C 48/002* (2019.02); *B29K 2029/04* (2013.01); *B29K 2995/0062* (2013.01); *B29L 2031/7128* (2013.01)

(58) Field of Classification Search
CPC .......... B29C 48/002; B29K 2995/0062; B29L 2031/7128
(Continued)

(56) References Cited

U.S. PATENT DOCUMENTS

2016/0331649 A1 11/2016 Schaper

FOREIGN PATENT DOCUMENTS

CN 103192532 A 7/2013
EP 3677405 A1 7/2020
(Continued)

OTHER PUBLICATIONS

International Search Report dated May 17, 2023, in PCT/EP2023/055192, filed Mar. 1, 2023.
(Continued)

*Primary Examiner* — Christina A Johnson
*Assistant Examiner* — Xue H Liu
(74) *Attorney, Agent, or Firm* — Lerner David LLP

(57) ABSTRACT

The invention relates to a method of manufacturing a water-soluble sheet having an area of structured surface pattern, the structured surface pattern having one or more structural features having a measurement of less than 1000 μm wherein the method comprises the steps of:

Figure 1:

a) providing a substrate having an area of complementary structured surface pattern;
b) depositing a solution comprising a water-soluble polymer onto the substrate; and
c) drying the solution to form a water-soluble sheet comprising an area of structured surface pattern.

20 Claims, 9 Drawing Sheets

(58) Field of Classification Search
USPC .................................................... 264/210.2
See application file for complete search history.

(56) References Cited

FOREIGN PATENT DOCUMENTS

| | | | |
|---|---|---|---|
| EP | 3904435 | A1 | 11/2021 |
| EP | 3904436 | A1 | 11/2021 |
| EP | 4001347 | A1 | 5/2022 |
| WO | 9404656 | A2 | 3/1994 |

OTHER PUBLICATIONS

Written Opinion of the International Searching Authority dated May 17, 2023, in PCT/EP2023/055192, filed Mar. 1, 2023.
Combined Search and Examination Report dated Sep. 16, 2022, in GB Application No. 2203720.4, filed Mar. 17, 2022.

PROCESS FOR MANUFACTURING A WATER-SOLUBLE SHEET

TECHNICAL FIELD OF THE INVENTION

The present invention relates to methods of manufacturing a water-soluble sheet. More specifically, the invention relates to the manufacturing of a water-soluble sheet having a structured surface pattern via a solution cast process or a cast extrusion process.

BACKGROUND TO THE INVENTION

It is known to package chemical compositions which may be of a hazardous or irritant nature in water-soluble or water dispersible materials such as films, pouches, capsules or sachets. The package can simply be added to water in order to dissolve or disperse the contents of the package into the water.

In fields such as detergents for domestic use, an attractive appearance and the haptic perception for an article is extremely desirable. Consequently, there is a constant need of consumer products to provide technical and aesthetic differentiation versus the competitor offerings.

It is known to form water-soluble sheets having an improved appearance. For example, US2015273815 discloses an inking-pad printing process of a water-soluble detergent bag and US2008190808 discloses a water-soluble packaging embedded with various security elements which will get irreversibly dissolved and destroyed upon usage of the package in water. Moreover, it is known in EP2955219 to form a water-soluble film having an area of embossment by applying an embossment to the film.

However, a problem associated with this method is that the process of embossing the film may damage the properties of the film. For example, embossing of an existing film as described in EP2955219 may damage the film resulting in micro holes and/or fissures. This may then subsequently lead to leaking pouches if the embossment is made across the forming area of the film in contact with solid or liquid detergent ingredients.

Moreover, including an embossing step into an already existing film-manufacturing line will significantly alter the film properties due to the mechanical and thermal stresses applied. The higher mechanical and thermal stresses placed on the films due to embossing means that the method will not be suitable to mass-embossing of a film and will likely result in the corresponding surface patterns quickly showing signs of wear. Moreover, typical embossment processes also result in significant wear on the equipment used to carry out the embossment process. In contrast, the process of the present invention is less demanding on the equipment used. It is therefore an aim of the present invention to provide a process for manufacturing a water-soluble sheet having an area of structured surface pattern wherein the area of structured surface pattern is applied during the formation of the water-soluble sheet.

It is furthermore an aim of embodiments of the present invention to provide a process for manufacturing a water-soluble sheet having an improved appearance and/or improved haptic and technical properties, such as an improved sealing strength and reduced coefficient of friction.

It is also an aim of embodiments of the present invention to provide a process for manufacturing a water-soluble sheet having a structured surface pattern without compromising the technical properties of the resulting film. For example, to provide a process for manufacturing a water-soluble sheet having a structured surface pattern without negatively affecting the sealing properties, tensile strength, hydrophobicity and/or hydrophilicity of the resulting film.

It is also an aim of embodiments of the invention to overcome at least one problem of the prior art, whether expressly disclosed herein or not.

SUMMARY OF THE INVENTION

In a first aspect of the present invention, there is provided a method of manufacturing a water-soluble sheet having an area of structured surface pattern, the structured surface pattern having one or more structural features having a measurement of less than 1000 μm, wherein the method comprises the steps of:

a) providing a substrate having an area of complementary structured surface pattern;

b) depositing a solution comprising a water-soluble polymer onto the substrate; and c) drying the solution to form a water-soluble sheet comprising an area of structured surface pattern.

The aforementioned process enables the formation of a water-soluble sheet having an area of structured surface pattern. Beneficially, the process forms the area of structured surface pattern during formation of the water-soluble sheet. This enables the production of a water-soluble sheet having an area of structured surface pattern without having to apply the structured surface pattern after the formation of the water-soluble sheet, which in turn may damage the surface of the water-soluble sheet.

Beneficially, the process does not significantly alter existing manufacturing processes, such as by requiring the addition of an embossing step. This reduces costs and simplifies the manufacturing process.

Additionally, since the process of the present invention does not place mechanical and thermal stresses on the water-soluble sheets, the process may be suitable for mass-embossing of the sheets and the process may allow the structured surface pattern to be applied across both a forming and sealing area of a film. This means that areas of a film which are in contact with solid or liquid detergent ingredients may have a structured surface pattern applied without risk of leaking.

The term 'water-soluble' is used herein to refer to a material which and at least partially dissolves or disperses in water at 20° C. within 10 minutes. The term 'water-soluble package' is used herein to refer to a package which at least partially disperses, disintegrates or ruptures in water at 20° C. within 10 minutes to allow for egress of the contents of the package into the surrounding water.

The term "structured surface pattern" is used herein to refer to one or more structural features present on a surface having a measurement of less than 1000 μm. The structural feature may be any physical feature that has a measurement of less than 1000 μm. The measurement may be any physical distance such as a peak height, depression depth, width, length, peak to peak or centre to centre distance, but particularly centre to centre or peak to peak.

Preferably, the structural features are nanostructures and/or microstructures. By "nanostructure" it is meant structures having one or more structural features measured on a nanoscale. By "microstructure" it is meant structures having one or more structural features measured on a micrometre scale.

The area of structured surface pattern may be present over the entire surface of the water-soluble sheet. Alternatively, the area of structured surface pattern may be present over a part of the sheet.

The area of structured surface pattern may be present over the surface of at least one side of the water-soluble sheet. The area of structured surface pattern may cover both sides of the water-soluble sheet. The area of structured surface pattern may cover between 1 and 100% of the surface of at least one side of the water-soluble sheet, or from 1-50%, or from 1-25%, or from 1-10% of the surface of at least one side of the water-soluble sheet.

The area of structured surface pattern may form a shape on the surface of the water-soluble sheet. The shape may be regular or irregular.

The area of structured surface pattern may form an image on the surface of the water-soluble sheet. The image may be a logo.

The area of structured surface pattern may form text on the surface of the water-soluble sheet.

The structured surface pattern may comprise one or more protrusions. The protrusion may have any suitable shape. The protrusion may be a ridge, a circular protrusion, a rectangular protrusion, a cross shaped protrusion, and/or a hexagonal shaped protrusion.

The ridge may be a linear ridge and/or a sinusoidal ridge.

The structured surface pattern may comprise one or more depressions. The depression may be a groove, a rectangular depression, a cross shaped depression, a circular depression and/or a hexagonal shaped depression.

The groove may be a linear groove and/or a sinusoidal groove.

The structured surface pattern may comprise protrusions and depressions.

Preferably, the surface pattern comprises a plurality of protrusions.

The protrusions may be parallel. In preferred embodiments the protrusions comprise parallel protrusions across at least part of the sheet.

The depressions may be parallel. In preferred embodiments, the depressions comprise parallel depressions across at least part of the sheet.

The centre to centre distance between adjacent protrusions and/or depressions may be less than 1000 μm. The centre to centre distance may be at least 1, 2, 5, 10, 25, 50, 75, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 or at least 1500 nm and/or no more than 1000, 900, 800, 700, 600, 500, 400, 300, 200, 100, 75, 50, 25, 20, 15, 10, 5, or no more than 2 μm. Preferably, the centre to centre distance may be from 1 nm-1000 μm, 100 nm-1000 μm, 300 nm-1000 μm, 400 nm-1000 μm, 500 nm-1000 μm, 600 nm-1000 μm, 700 nm-1000 μm, 800 nm-1000 μm, 900 nm-1000 μm, 1000 nm-1000 μm, 10 μm-1000 μm, 15 μm-1000 μm, 25 μm-1000 μm, 50 μm-1000 μm, 100 μm-1000 μm, 200 μm-1000 μm, 300 μm-1000 μm, 400 μm-1000 μm, 500 μm-1000 μm, 1 nm-750 μm, 100 nm-750 μm, 300 nm-750 μm, 300 nm-750 μm, 400 nm-750 μm, 500 nm-750 μm, 600 nm-750 μm, 700 nm-750 μm, 800 nm-750 μm, 900 nm-750 μm, 1000 nm-750 μm, 10 μm-750 μm, 15 μm-750 μm, 25 μm-750 μm, 50 μm-750 μm, 100 μm-750 μm, 200 μm-750 μm, 300 μm-750 μm, 400 μm-750 μm, 500 μm-750 μm, 1 nm-500 μm, 100 nm-500 μm, 300 nm-500 μm, 300 nm-500 μm, 400 nm-500 μm, 500 nm-500 μm, 600 nm-500 μm, 700 nm-500 μm, 800 nm-500 μm, 900 nm-500 μm, 1000 nm-500 μm, 10 μm-500 μm, 15 μm-500 μm, 25 μm-500 μm, 50 μm-500 μm, 100 μm-500 μm, 200 μm-500 μm, 300 μm-500 μm, 400 μm-500 μm, 1 nm-250 μm, 100 nm-250 μm, 300 nm-250 μm, 400 nm-250 μm, 500 nm-250 μm, 600 nm-250 μm, 700 nm-250 μm, 800 nm-250 μm, 900 nm-250 μm, 1000 nm-250 μm, 10 μm-250 μm, 15 μm-250 μm, 25 μm-250 μm, 50 μm-250 μm, 100 μm-250 μm, 200 μm-250 μm, 1 nm-100 μm, 100 nm-100 μm, 300 nm-100 μm, 400 nm-100 μm, 500 nm-100 μm, 600 nm-100 μm, 700 nm-100 μm, 800 nm-100 μm, 900 nm-100 μm, 1000 nm-100 μm, 10 μm-100 μm, 10 μm-100 μm, 25 μm-100 μm, 50 μm-100 μm.

Most preferably, the centre to centre distance between the protrusions and/or depressions is 500 nm-100 μm.

The protrusions and/or depressions may be periodic. In such an embodiment, the centre to centre distance between adjacent protrusions and/or depressions is substantially the same across at least a part of the water-soluble sheet.

The peak height of the protrusions may be less than 1000 μm. The peak height may be at least 1, 2, 5, 10, 25, 50, 75, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 or at least 1500 nm and/or no more than 1000, 900, 800, 700, 600, 500, 400, 300, 200, 100, 75, 50, 25, 20, 15, 10, 5, or no more than 2 μm. Preferably, the peak height may be from 1 nm-1000 μm, 100 nm-1000 μm, 300 nm-1000 μm, 300 nm-1000 μm, 400 nm-1000 μm, 500 nm-1000 μm, 600 nm-1000 μm, 700 nm-1000 μm, 800 nm-1000 μm, 900 nm-1000 μm, 1000 nm-1000 μm, 10 μm-1000 μm, 15 μm-1000 μm, 25 μm-1000 μm, 50 μm-1000 μm, 100 μm-1000 μm, 200 μm-1000 μm, 300 μm-1000 μm, 400 μm-1000 μm, 500 μm-1000 μm, 1 nm-750 μm, 100 nm-750 μm, 300 nm-750 μm, 400 nm-750 μm, 500 nm-750 μm, 600 nm-750 μm, 700 nm-750 μm, 800 nm-750 μm, 900 nm-750 μm, 1000 nm-750 μm, 10 μm-750 μm, 15 μm-750 μm, 25 μm-750 μm, 50 μm-750 μm, 100 μm-750 μm, 200 μm-750 μm, 300 μm-750 μm, 400 μm-750 μm, 500 μm-750 μm, 1 nm-500 μm, 100 nm-500 μm, 300 nm-500 μm, 300 nm-500 μm, 400 nm-500 μm, 500 nm-500 μm, 600 nm-500 μm, 700 nm-500 μm, 800 nm-500 μm, 900 nm-500 μm, 1000 nm-500 μm, 10 μm-500 μm, 15 μm-500 μm, 25 μm-500 μm, 50 μm-500 μm, 100 μm-500 μm, 200 μm-500 μm, 300 μm-500 μm, 400 μm-500 μm, 1 nm-250 μm, 100 nm-250 μm, 300 nm-250 μm, 400 nm-250 μm, 500 nm-250 μm, 600 nm-250 μm, 700 nm-250 μm, 800 nm-250 μm, 900 nm-250 μm, 1000 nm-250 μm, 10 μm-250 μm, 15 μm-250 μm, 25 μm-250 μm, 50 μm-250 μm, 100 μm-250 μm, 200 μm-250 μm, 1 nm-100 μm, 100 nm-100 μm, 300 nm-100 μm, 400 nm-100 μm, 500 nm-100 μm, 600 nm-100 μm, 700 nm-100 μm, 800 nm-100 μm, 900 nm-100 μm, 1000 nm-100 μm, 10 μm-100 μm, 10 μm-100 μm, 25 μm-100 μm, 50 μm-100 μm.

The protrusions and/or depressions may have a width of less than 1000 μm. The width may be at least 1, 2, 5, 10, 25, 50, 75, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 or at least 1500 nm and/or no more than 1000, 900, 800, 700, 600, 500, 400, 300, 200, 100, 75, 50, 25, 20, 15, 10, 5, or no more than 2 μm. Preferably, the width may be from 1 nm-1000 μm, 100 nm-1000 μm, 300 nm-1000 μm, 300 nm-1000 μm, 400 nm-1000 μm, 500 nm-1000 μm, 600 nm-1000 μm, 700 nm-1000 μm, 800 nm-1000 μm, 900 nm-1000 μm, 1000 nm-1000 μm, 10 μm-1000 μm, 15 μm-1000 μm, 25 μm-1000 μm, 50 μm-1000 μm, 100 μm-1000 μm, 200 μm-1000 μm, 300 μm-1000 μm, 400 μm-1000 μm, 500 μm-1000 μm, 1 nm-750 μm, 100 nm-750 μm, 300 nm-750 μm, 400 nm-750 μm, 500 nm-750 μm, 600 nm-750 μm, 700 nm-750 μm, 800 nm-750 μm, 900 nm-750 μm, 1000 nm-750 μm, 10 μm-750 μm, 10 μm-750 μm, 25 μm-750 μm, 50 μm-750 μm, 100

μm-750 μm, 200 μm-750 μm, 300 μm-750 μm, 400 μm-750 μm, 500 μm-750 μm, 1 nm-500 μm, 100 nm-500 μm, 300 nm-500 μm, 300 nm-500 μm, 400 nm-500 μm, 500 nm-500 μm, 600 nm-500 μm, 700 nm-500 μm, 800 nm-500 μm, 900 nm-500 μm, 1000 nm-500 μm, 10 μm-500 μm, 15 μm-500 μm, 25 μm-500 μm, 50 μm-500 μm, 100 μm-500 μm, 200 μm-500 μm, 300 μm-500 μm, 400 μm-500 μm, lnm-250 μm, 100 nm-250 μm, 300 nm-250 μm, 400 nm-250 μm, 500 nm-250 μm, 600 nm-250 μm, 700 nm-250 μm, 800 nm-250 μm, 900 nm-250 μm, 1000 nm-250 μm, 10 μm-250 μm, 15 μm-250 μm, 25 μm-250 μm, 50 μm-250 μm, 100 μm-250 μm, 200 μm-250 μm, 1 nm-100 μm, 100 nm-100 μm, 300 nm-100 μm, 400 nm-100 μm, 500 nm-100 μm, 600 nm-100 μm, 700 nm-100 μm, 800 nm-100 μm, 900 nm-100 μm, 1000 nm-100 μm, 10 μm-100 μm, 10 μm-100 μm, 25 μm-100 μm, 50 μm-100 μm.

The protrusions and/or depressions may have a length of less than 1000 μm. The length may be at least 1, 2, 5, 10, 25, 50, 75, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 or at least 1500 nm and/or no more than 1000, 900, 800, 700, 600, 500, 400, 300, 200, 100, 75, 50, 25, 20, 15, 10, 5, or no more than 2 μm. Preferably, the length may be from 1 nm-1000 μm, 100 nm-1000 μm, 300 nm-1000 μm, 300 nm-1000 μm, 400 nm-1000 μm, 500 nm-1000 μm, 600 nm-1000 μm, 700 nm-1000 μm, 800 nm-1000 μm, 900 nm-1000 μm, 1000 nm-1000 μm, 10 μm-1000 μm, 15 μm-1000 μm, 25 μm-1000 μm, 50 μm-1000 μm, 100 μm-1000 μm, 200 μm-1000 μm, 300 μm-1000 μm, 400 μm-1000 μm, 500 μm-1000 μm, 1 nm-750 μm, 100 nm-750 μm, 300 nm-750 μm, 400 nm-750 μm, 500 nm-750 μm, 600 nm-750 μm, 700 nm-750 μm, 800 nm-750 μm, 900 nm-750 μm, 1000 nm-750 μm, 10 μm-750 μm, 10 μm-750 μm, 25 μm-750 μm, 50 μm-750 μm, 100 μm-750 μm, 200 μm-750 μm, 300 μm-750 μm, 400 μm-750 μm, 500 μm-750 μm, 1 nm-500 μm, 100 nm-500 μm, 300 nm-500 μm, 300 nm-500 μm, 400 nm-500 μm, 500 nm-500 μm, 600 nm-500 μm, 700 nm-500 μm, 800 nm-500 μm, 900 nm-500 μm, 1000 nm-500 μm, 10 μm-500 μm, 15 μm-500 μm, 25 μm-500 μm, 50 μm-500 μm, 100 μm-500 μm, 200 μm-500 μm, 300 μm-500 μm, 400 μm-500 μm, 1 nm-250 μm, 100 nm-250 μm, 300 nm-250 μm, 300 nm-250 μm, 400 nm-250 μm, 500 nm-250 μm, 600 nm-250 μm, 700 nm-250 μm, 800 nm-250 μm, 900 nm-250 μm, 1000 nm-250 μm, 10 μm-250 μm, 15 μm-250 μm, 25 μm-250 μm, 50 μm-250 μm, 100 μm-250 μm, 200 μm-250 μm, 1 nm-100 μm, 100 nm-100 μm, 300 nm-100 μm, 400 nm-100 μm, 500 nm-100 μm, 600 nm-100 μm, 700 nm-100 μm, 800 nm-100 μm, 900 nm-100 μm, 1000 nm-100 μm, 10 μm-100 μm, 10 μm-100 μm, 25 μm-100 μm, 50 μm-100 μm.

The protrusions may be arranged in at least 100, 200, 250, 300, 350, 400, 450, 500, 550, 600, 650, 700, 750, 800, 850, 900, or at least 1000 protrusions per mm and/or no more than 1500, 1450, 1400, 1350, 1300, 1250, 1200, 1150, 1100, 1050, 1025, or no more than 1000 protrusions per mm. Preferably, the protrusions may be arranged in a surface pattern of 500-1500 protrusions per mm, 750-1250 protrusions per mm, 900-1100 protrusions per mm, or 950-1050 protrusions per mm. Most preferably, the protrusions are arranged in a surface pattern of 1000 protrusions per mm.

The depressions may be arranged in a surface pattern of at least 100, 200, 250, 300, 350, 400, 450, 500, 550, 600, 650, 700, 750, 800, 850, 900, or at least 1000 depressions per mm and/or no more than 1500, 1450, 1400, 1350, 1300, 1250, 1200, 1150, 1100, 1050, 1025, or no more than 1000 depressions per mm. Preferably, the depressions may be arranged in a surface pattern of 500-1500 depressions per mm, 750-1250 depressions per mm, 900-1100 depressions per mm, or 950-1050 depressions per mm. Most preferably, the depressions are arranged in a surface pattern of 1000 depressions per mm.

The complementary structured surface pattern may comprise one or more depressions.

The depression may be a groove, a rectangular depression, a circular depression, a cross shaped depression and/or a hexagonal shaped depression.

The groove may be a linear groove and/or a sinusoidal groove.

The complementary structured surface pattern may comprise one or more protrusions. The protrusion may be a ridge, a cross shaped protrusion, and/or a hexagonal shaped protrusion.

The protrusion may be a linear ridge and/or a sinusoidal ridge.

Preferably, the complementary structured surface pattern comprises a plurality of depressions.

The centre to centre distance between adjacent protrusions and/or depressions may be less than 1000 μm. The centre to centre distance may be at least 1, 2, 5, 10, 25, 50, 75, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 or at least 1500 nm and/or no more than 1000, 900, 800, 700, 600, 500, 400, 300, 200, 100, 75, 50, 25, 20, 15, 10, 5, or no more than 2 μm. Preferably, the centre to centre distance may be from 1 nm-1000 μm, 100 nm-1000 μm, 300 nm-1000 μm, 300 nm-1000 μm, 400 nm-1000 μm, 500 nm-1000 μm, 600 nm-1000 μm, 700 nm-1000 μm, 800 nm-1000 μm, 900 nm-1000 μm, 1000 nm-1000 μm, 10 μm-1000 μm, 15 μm-1000 μm, 25 μm-1000 μm, 50 μm-1000 μm, 100 μm-1000 μm, 200 μm-1000 μm, 300 μm-1000 μm, 400 μm-1000 μm, 500 μm-1000 μm, 1 nm-750 μm, 100 nm-750 μm, 300 nm-750 μm, 400 nm-750 μm, 500 nm-750 μm, 600 nm-750 μm, 700 nm-750 μm, 800 nm-750 μm, 900 nm-750 μm, 1000 nm-750 μm, 10 μm-750 μm, 10 μm-750 μm, 25 μm-750 μm, 50 μm-750 μm, 100 μm-750 μm, 200 μm-750 μm, 300 μm-750 μm, 400 μm-750 μm, 500 μm-750 μm, 1 nm-500 μm, 100 nm-500 μm, 300 nm-500 μm, 300 nm-500 μm, 400 nm-500 μm, 500 nm-500 μm, 600 nm-500 μm, 700 nm-500 μm, 800 nm-500 μm, 900 nm-500 μm, 1000 nm-500 μm, 10 μm-500 μm, 15 μm-500 μm, 25 μm-500 μm, 50 μm-500 μm, 100 μm-500 μm, 200 μm-500 μm, 300 μm-500 μm, 400 μm-500 μm, 1 nm-250 μm, 100 nm-250 μm, 300 nm-250 μm, 400 nm-250 μm, 500 nm-250 μm, 600 nm-250 μm, 700 nm-250 μm, 800 nm-250 μm, 900 nm-250 μm, 1000 nm-250 μm, 10 μm-250 μm, 15 μm-250 μm, 25 μm-250 μm, 50 μm-250 μm, 100 μm-250 μm, 200 μm-250 μm, 1 nm-100 μm, 100 nm-100 μm, 300 nm-100 μm, 400 nm-100 μm, 500 nm-100 μm, 600 nm-100 μm, 700 nm-100 μm, 800 nm-100 μm, 900 nm-100 μm, 1000 nm-100 μm, 10 μm-100 μm, 10 μm-100 μm, 25 μm-100 μm, 50 μm-100 μm.

The depressions may have a depth of less than 1000 μm. The depth may be at least 1, 2, 5, 10, 25, 50, 75, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 or at least 1500 nm and/or no more than 1000, 900, 800, 700, 600, 500, 400, 300, 200, 100, 75, 50, 25, 20, 15, 10, 5, or no more than 2 μm. Preferably, the depth may be from 1 nm-1000 μm, 100 nm-1000 μm, 300 nm-1000 μm, 300 nm-1000 μm, 400 nm-1000 μm, 500 nm-1000 μm, 600 nm-1000 μm, 700 nm-1000 μm, 800 nm-1000 μm, 900 nm-1000 μm, 1000 nm-1000 μm, 10 μm-1000 μm, 15 μm-1000 μm, 25 μm-1000 μm, 50 μm-1000 μm, 100 μm-1000 μm, 200 μm-1000 μm, 300 μm-1000 μm, 400 μm-1000 μm, 500 μm-1000 μm, 1 nm-750 μm, 100 nm-750 μm, 300 nm-750 μm, 300 nm-750 μm, 400 nm-750 μm, 500 nm-750 μm, 600 nm-750 μm, 700 nm-750 μm, 800 nm-750 μm, 900 nm-750 μm, 1000 nm-750 μm, 10 μm-750 μm, 10 μm-750 μm, 25 μm-750 μm, 50 μm-750 μm, 100 μm-750 μm, 200 μm-750 μm, 300 μm-750 μm, 400 μm-750 μm, 500 μm-750 μm, 1 nm-500 μm, 100 nm-500 μm, 300 nm-500 μm, 400 nm-500 μm, 500 nm-500 μm, 600 nm-500 μm, 700 nm-500 μm, 800 nm-500 μm, 900 nm-500 μm, 1000 nm-500 μm, 10 μm-500 μm, 15 μm-500 μm, 25 μm-500 μm, 50 μm-500 μm, 100 μm-500 μm, 200 μm-500 μm, 300 μm-500 μm, 400 μm-500 μm, 1 nm-250 μm, 100 nm-250 μm, 300 nm-250 μm, 300 nm-250 μm, 400 nm-250 μm, 500 nm-250 μm, 600 nm-250 μm, 700 nm-250 μm, 800 nm-250 μm, 900 nm-250 μm, 1000 nm-250 μm, 10 μm-250 μm, 15 μm-250 μm, 25 μm-250 μm, 50 μm-250 μm, 100 μm-250 μm, 200 μm-250 μm, 1 nm-100 μm, 100 nm-100 μm, 300 nm-100 μm, 400 nm-100 μm, 500 nm-100 μm, 600 nm-100 μm, 700 nm-100 μm, 800 nm-100 μm, 900 nm-100 μm, 1000 nm-100 μm, 10 μm-100 μm, 10 μm-100 μm, 25 μm-100 μm, 50 μm-100 μm.

The peak height of the protrusions may be less than 1000 μm. The peak height may be at least 1, 2, 5, 10, 25, 50, 75, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 or at least 1500 nm and/or no more than 1000, 900, 800, 700, 600, 500, 400, 300, 200, 100, 75, 50, 25, 20, 15, 10, 5, or no more than 2 μm. Preferably, the peak height may be from 1 nm-1000 μm, 100 nm-1000 μm, 300 nm-1000 μm, 400 nm-1000 μm, 500 nm-1000 μm, 600 nm-1000 μm, 700 nm-1000 μm, 800 nm-1000 μm, 900 nm-1000 μm, 1000 nm-1000 μm, 10 μm-1000 μm, 15 μm-1000 μm, 25 μm-1000 μm, 50 μm-1000 μm, 100 μm-1000 μm, 200 μm-1000 μm, 300 μm-1000 μm, 400 μm-1000 μm, 500 μm-1000 μm, 1 nm-750 μm, 100 nm-750 μm, 300 nm-750 μm, 300 nm-750 μm, 400 nm-750 μm, 500 nm-750 μm, 600 nm-750 μm, 700 nm-750 μm, 800 nm-750 μm, 900 nm-750 μm, 1000 nm-750 μm, 10 μm-750 μm, 15 μm-750 μm, 25 μm-750 μm, 50 μm-750 μm, 100 μm-750 μm, 200 μm-750 μm, 300 μm-750 μm, 400 μm-750 μm, 500 μm-750 μm, 1 nm-500 μm, 100 nm-500 μm, 300 nm-500 μm, 300 nm-500 μm, 400 nm-500 μm, 500 nm-500 μm, 600 nm-500 μm, 700 nm-500 μm, 800 nm-500 μm, 900 nm-500 μm, 1000 nm-500 μm, 10 μm-500 μm, 15 μm-500 μm, 25 μm-500 μm, 50 μm-500 μm, 100 μm-500 μm, 200 μm-500 μm, 300 μm-500 μm, 400 μm-500 μm, 1 nm-250 μm, 100 nm-250 μm, 300 nm-250 μm, 400 nm-250 μm, 500 nm-250 μm, 600 nm-250 μm, 700 nm-250 μm, 800 nm-250 μm, 900 nm-250 μm, 1000 nm-250 μm, 10 μm-250 μm, 15 μm-250 μm, 25 μm-250 μm, 50 μm-250 μm, 100 μm-250 μm, 200 μm-250 μm, 1 nm-100 μm, 100 nm-100 μm, 300 nm-100 μm, 400 nm-100 μm, 500 nm-100 μm, 600 nm-100 μm, 700 nm-100 μm, 800 nm-100 μm, 900 nm-100 μm, 1000 nm-100 μm, 10 μm-100 μm, 10 μm-100 μm, 25 μm-100 μm, 50 μm-100 μm.

The protrusions and/or depressions may have a width of less than 1000 μm. The width may be at least 1, 2, 5, 10, 25, 50, 75, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 or at least 1500 nm and/or no more than 1000, 900, 800, 700, 600, 500, 400, 300, 200, 100, 75, 50, 25, 20, 15, 10, 5, or no more than 2 μm. Preferably, the width may be from 1 nm-1000 μm, 100 nm-1000 μm, 300 nm-1000 μm, 400 nm-1000 μm, 500 nm-1000 μm, 600 nm-1000 μm, 700 nm-1000 μm, 800 nm-1000 μm, 900 nm-1000 μm, 1000 nm-1000 μm, 10 μm-1000 μm, 15 μm-1000 μm, 25 μm-1000 μm, 50 μm-1000 μm, 100 μm-1000 μm, 200 μm-1000 μm, 300 μm-1000 μm, 400 μm-1000 μm, 500 μm-1000 μm, 1 nm-750 μm, 100 nm-750 μm, 300 nm-750 μm, 400 nm-750 μm, 500 nm-750 μm, 600 nm-750 μm, 700 nm-750 μm, 800 nm-750 μm, 900 nm-750 μm, 1000 nm-750 μm, 10 μm-750 μm, 15 μm-750 μm, 25 μm-750 μm, 50 μm-750 μm, 100 μm-750 μm, 200 μm-750 μm, 300 μm-750 μm, 400 μm-750 μm, 500 μm-750 μm, 1 nm-500 μm, 100 nm-500 μm, 300 nm-500 μm, 300 nm-500 μm, 400 nm-500 μm, 500 nm-500 μm, 600 nm-500 μm, 700 nm-500 μm, 800 nm-500 μm, 900 nm-500 μm, 1000 nm-500 μm, 10 μm-500 μm, 15 μm-500 μm, 25 μm-500 μm, 50 μm-500 μm, 100 μm-500 μm, 200 μm-500 μm, 300 μm-500 μm, 400 μm-500 μm, 1 nm-250 μm, 100 nm-250 μm, 300 nm-250 μm, 400 nm-250 μm, 500 nm-250 μm, 600 nm-250 μm, 700 nm-250 μm, 800 nm-250 μm, 900 nm-250 μm, 1000 nm-250 μm, 10 μm-250 μm, 15 μm-250 μm, 25 μm-250 μm, 50 μm-250 μm, 100 μm-250 μm, 200 μm-250 μm, 1 nm-100 μm, 100 nm-100 μm, 300 nm-100 μm, 400 nm-100 μm, 500 nm-100 μm, 600 nm-100 μm, 700 nm-100 μm, 800 nm-100 μm, 900 nm-100 μm, 1000 nm-100 μm, 10 μm-100 μm, 10 μm-100 μm, 25 μm-100 μm, 50 μm-100 μm.

The protrusions and/or depressions may have a length of less than length of less than 1000 μm. The length may be at least 1, 2, 5, 10, 25, 50, 75, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 or at least 1500 nm and/or no more than 1000, 900, 800, 700, 600, 500, 400, 300, 200, 100, 75, 50, 25, 20, 15, 10, 5, or no more than 2 μm. Preferably, the length may be from 1 nm-1000 μm, 100 nm-1000 μm, 300 nm-1000 μm, 400 nm-1000 μm, 500 nm-1000 μm, 600 nm-1000 μm, 700 nm-1000 μm, 800 nm-1000 μm, 900 nm-1000 μm, 1000 nm-1000 μm, 10 μm-1000 μm, 15 μm-1000 μm, 25 μm-1000 μm, 50 μm-1000 μm, 100 μm-1000 μm, 200 μm-1000 μm, 300 μm-1000 μm, 400 μm-1000 μm, 500 μm-1000 μm, 1 nm-750 μm, 100 nm-750 μm, 300 nm-750 μm, 300 nm-750 μm, 400 nm-750 μm, 500 nm-750 μm, 600 nm-750 μm, 700 nm-750 μm, 800 nm-750 μm, 900 nm-750 μm, 1000 nm-750 μm, 10 μm-750 μm, 10 μm-750 μm, 25 μm-750 μm, 50 μm-750 μm, 100 μm-750 μm, 200 μm-750 μm, 300 μm-750 μm, 400 μm-750 μm, 500 μm-750 μm, 1 nm-500 μm, 100 nm-500 μm, 300 nm-500 μm, 400 nm-500 μm, 500 nm-500 μm, 600 nm-500 μm, 700 nm-500 μm, 800 nm-500 μm, 900 nm-500 μm, 1000 nm-500 μm, 10 μm-500 μm, 15 μm-500 μm, 25 μm-500 μm, 50 μm-500 μm, 100 μm-500 μm, 200 μm-500 μm, 300 μm-500 μm, 400 μm-500 μm, 1 nm-250 μm, 100 nm-250 μm, 300 nm-250 μm, 400 nm-250 μm, 500 nm-250 μm, 600 nm-250 μm, 700 nm-250 μm, 800 nm-250 μm, 900 nm-250 μm, 1000 nm-250 μm, 10 μm-250 μm, 15 μm-250 μm, 25 μm-250 μm, 50 μm-250 μm, 100 μm-250 μm, 200 μm-250 μm, 1 nm-100 μm, 100 nm-100 μm, 300 nm-100 μm, 400 nm-100 μm, 500 nm-100 μm, 600 nm-100 μm, 700 nm-100 μm, 800 nm-100 μm, 900 nm-100 μm, 1000 nm-100 μm, 10 μm-100 μm, 10 μm-100 μm, 25 μm-100 μm, 50 μm-100 μm.

The protrusions and/or depressions may be arranged in a surface pattern of at least 100, 200, 250, 300, 350, 400, 450, 500, 550, 600, 650, 700, 750, 800, 850, 900, or at least 1000 protrusions and/or depressions per mm and/or no more than 1500, 1450, 1400, 1350, 1300, 1250, 1200, 1150, 1100, 1050, 1025, or no more than 1000 protrusions and/or depressions per mm. Preferably, the protrusions and/or depressions may be arranged in a surface pattern of 500-1500 protrusions per mm, 750-1250 protrusions per mm, 900-1100 protrusions per mm, or 950-1050 protrusions per mm. Most preferably, the protrusions are arranged in a surface pattern of 1000 protrusions per mm.

The protrusions and/or depressions may be parallel. In preferred embodiments, the surface pattern comprises parallel protrusions and/or depressions across at least part of the substrate.

The area of structured surface pattern may be present over the entire surface of the substrate.

Alternatively, the area of structured surface pattern may be present over a part of the substrate.

The area of structured surface pattern may cover between 1 and 100% of the surface of at least one side of the substrate, or from 1-50%, or from 1-25%, or from 1-10% of the surface of at least one side of the substrate.

The area of structured surface pattern may form a shape on the surface of at least one side of the substrate. The shape may be regular or irregular.

In some embodiments the area of structured surface pattern may form an image on the surface of at least one side of the substrate. The image may be a logo. The area of nano-structured surface pattern may form text on the surface of at least one side of the substrate.

The water-soluble sheet preferably comprises a water-soluble polymer.

Preferred polymers (including copolymers, terpolymers, or derivatives thereof) suitable for use as a sheet material are selected from polyvinyl alcohols (PVOH), polyvinyl pyrrolidone, polyalkylene oxides, polyacrylamide, polyacrylic acid, cellulose, cellulose ethers, cellulose esters, cellulose amides, polyvinyl acetate, polycarboxylic acids and salts, polyaminoacids or peptides, polyamides, polyacrylamide, copolymers of maleic/acrylic acids, polysaccharides including starch, alginate and gelatin, natural gums such as Xanthan gum and Carrageenan gum, and combinations thereof. More preferred polymers are selected from PVOH, polyacrylates and water-soluble acrylate copolymers, methylcellulose, carboxymethylcellulose sodium, dextrin, ethylcellulose, hydroxyethyl cellulose, hydroxypropyl methylcellulose (HPMC), maltodextrin, polymethacrylates and combinations thereof. Most preferably, the water-soluble polymer may be selected from PVOH, PVOH based copolymers, HPMC and combinations thereof.

Preferably, the level of polymer in the sheet material, for example a PVOH polymer, is at least 60%. The polymer can have any weight average molecular weight, preferably from about 1000 to 1,000,000, more preferably from about 10,000 to 300,000, yet more preferably from about 20,000 to 150,000.

Preferably, the water-soluble sheet comprises, consists essentially of, or consists of PVOH The PVOH sheet may be partially or fully saponified or hydrolysed, for example, it may be from 40 to 100%, preferably 70 to 92%, most preferably about 85% to about 92%, saponified or hydrolysed, PVOH film. The degree of hydrolysis is known to influence the temperature at which the PVOH starts to dissolve in water. 85% hydrolysis corresponds to a sheet soluble in cold (i.e. room temperature) water, whereas 92% hydrolysis corresponds to a sheet soluble in warm water.

It is also possible for suitable additives such as plasticisers, one or more processing aids lubricants, anti-blocking agents and colouring agents to be added to the sheet.

In such an embodiment, the solution may further comprise one or more plasticisers, one or more processing aids lubricants, anti-blocking agents and colouring agents The substrate may be any material that may possess a structured surface pattern.

The substrate may be a metal or polymeric material.

The substrate may be silicon or a silicon derivative.

The metal may be any metal which may possess a structured surface pattern.

In some embodiments, the metal may be nickel, aluminium and/or silver.

The polymeric material may be selected from the group consisting of polyethylene terephthalate (PET), polyethylene, polytetrafluoroethylene, polypropylene, duroplast, polyvinyl chloride, polytetrafluoroethylene, polyamide, polycarbonate, Cyclic olefin copolymer and poly(methyl methacrylate).

The polymeric material may be in the form of a polymer foil.

The structured surface pattern of the substrate may be formed by any suitable texturing method and device known in the art, such as laser interference lithography, photolithography, mechanical fabrication, focused ion beam (FIB), photonic lithography, e-beam lithography, tool machining, ruling engines, diamond turning devices, and any other method or device that can produce nanometre and micrometre scale features.

Step b) may comprise cast extrusion or solution casting of the solution comprising a water-soluble polymer onto the substrate.

Upon contact of the water-soluble polymer solution with the substrate, an impression or negative of the substrate's structured surface pattern is formed on the surface of the water-soluble sheet upon formation.

This impression or negative may be the form of protrusions or depressions on the surface of the water-soluble sheet.

Preferably, the method further comprises the step of adjusting the thickness of the water-soluble sheet.

Preferably, the thickness is adjusted with a doctor blade.

Beneficially, when the thickness of the water-soluble sheet is adjusted the subsequently prepared water-soluble sheet exhibits improved clinginess.

In some embodiments of the invention, the process enables the formation of a water-soluble sheet having a unique appearance since upon the incident of polychromatic light onto the structured surface pattern, the light is diffracted into dispersed colours. This creates a water-soluble sheet having iridescent colour regions. Beneficially, this improves the appearance and distinctiveness of the sheet.

It has also been observed that the process enables the formation of a water-soluble sheet having an improved sealing strength.

In some embodiments, it has been observed that the process enables the formation of a water-soluble sheet having improved haptic properties, such as a reduced coefficient of friction.

In a second aspect of the present invention, there is provided a method of manufacturing a water-soluble sheet having an area of structured surface pattern, the structured surface pattern having one or more structural features having a measurement of less than 1000 μm, the method comprising the steps of:

a) providing a mixture comprising a water-soluble polymer;
b) extruding the mixture through a die;
c) contacting the mixture with a substrate having an area of complementary structured surface pattern; and
d) forming a water-soluble sheet comprising an area of structured surface pattern from the mixture.

Similar to the first aspect of the present invention, the aforementioned process enables the formation of a water-soluble sheet having an area of structured surface pattern, wherein the process forms the area of structured surface pattern during formation of the water-soluble sheet. This enables the production of a water-soluble sheet having an area of structured surface pattern without having to apply the structured surface pattern after the formation of the water-soluble sheet, which in turn may damage the surface of the water-soluble sheet.

Beneficially, a process according to the second aspect of the invention does not require significant alteration to existing manufacturing processes, such as by requiring the addition of an embossing step. This reduces costs and simplifies the manufacturing process.

Additionally, since the process of the second aspect does not place mechanical stress on the water-soluble sheets, the process may be suitable for continuous mass-embossing of the sheets. Moreover, the process may allow the structured surface pattern to be applied across both a forming and sealing area of the sheet. This means that areas of the sheet which are subsequently placed in contact with solid or liquid detergent ingredients may have a structured surface pattern applied.

In the second aspect of the present invention, the substrate may be a chill roll having a structured surface pattern as described herein.

The mixture may be at least partially liquid in step c).

The mixture may be flowable in step c).

Alternatively step b) may comprise extruding a water-soluble melt which is subsequently processed to form the film. In such embodiments, step b) may comprise forming a plurality of pellets or granules of the water-soluble mass, and step d) may comprise forming the pellets or granules into a film.

The pellets or granules may be formed by extruding the water-soluble melt, in the form of at least one rope, through a die plate comprising at least one depression and cutting the or each rope into pellets or granules using a cutting blade or blades, which may be a rotating cutting blade or blades.

The pellets or granules may be passed through a second extruder, which may be a single or twin-screw extruder for example, to form a film.

In a third aspect of the present invention there is provided an apparatus for forming a water-soluble sheet having an area of structured surface pattern.

The further aspects of the present invention may incorporate any of the features of the other aspects of the invention described herein as desired or as appropriate, and vice versa.

DETAILED DESCRIPTION OF THE INVENTION

In order that the invention may be more clearly understood, one or more embodiments thereof will now be described, by way of example only, with reference to the accompanying drawings, of which:

FIG. 1: is an image of a water-soluble sheet according to the present invention described in Example 1 (left) and a water-soluble sheet not according to the present invention described in Reference Example 2 (right).

Figure 2:
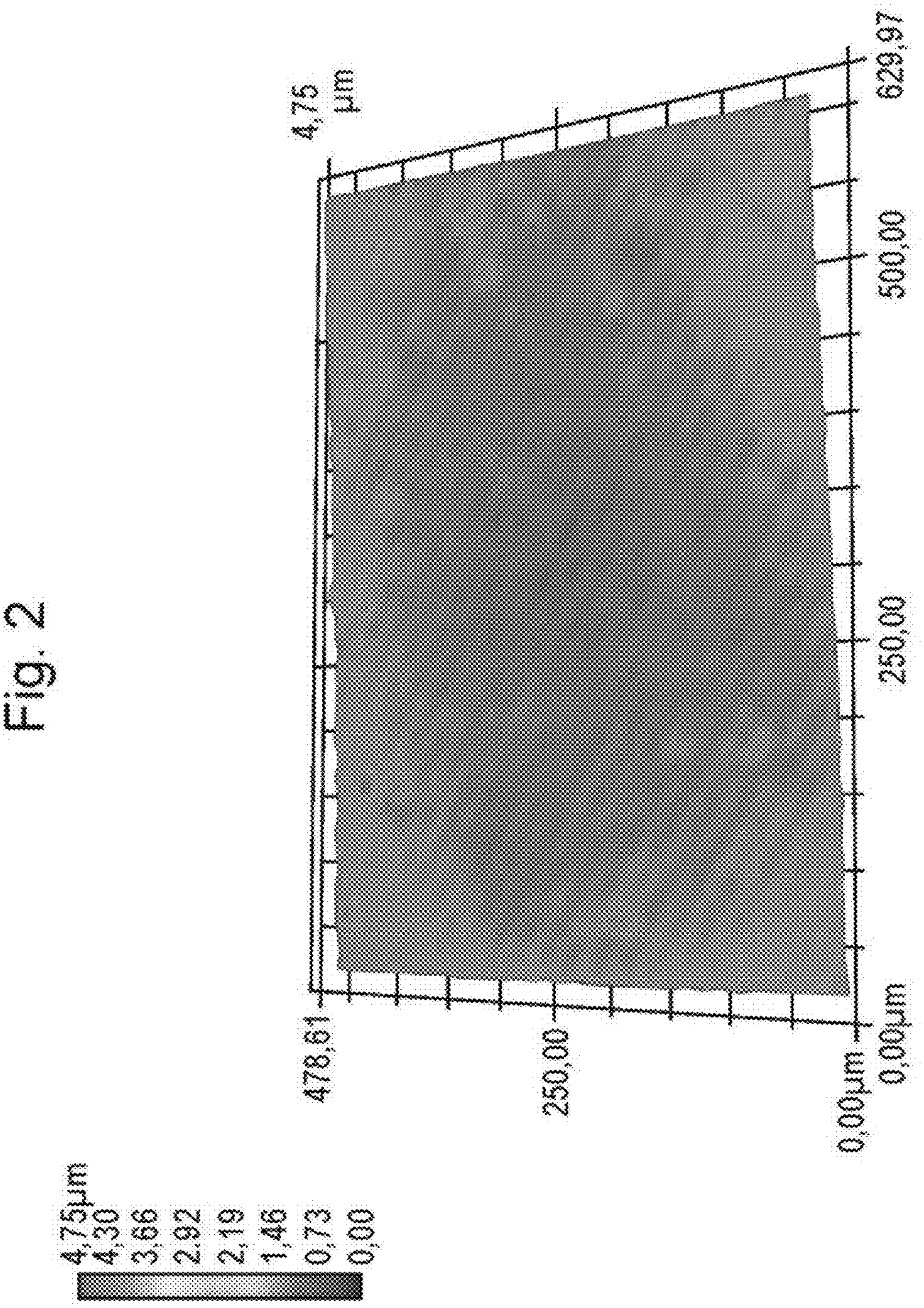

FIG. 2: is a digital microscope (Keyence VHX-7000 with lens VHX-E100) image of a film according to the present invention described in Example 1.

Figure 3:
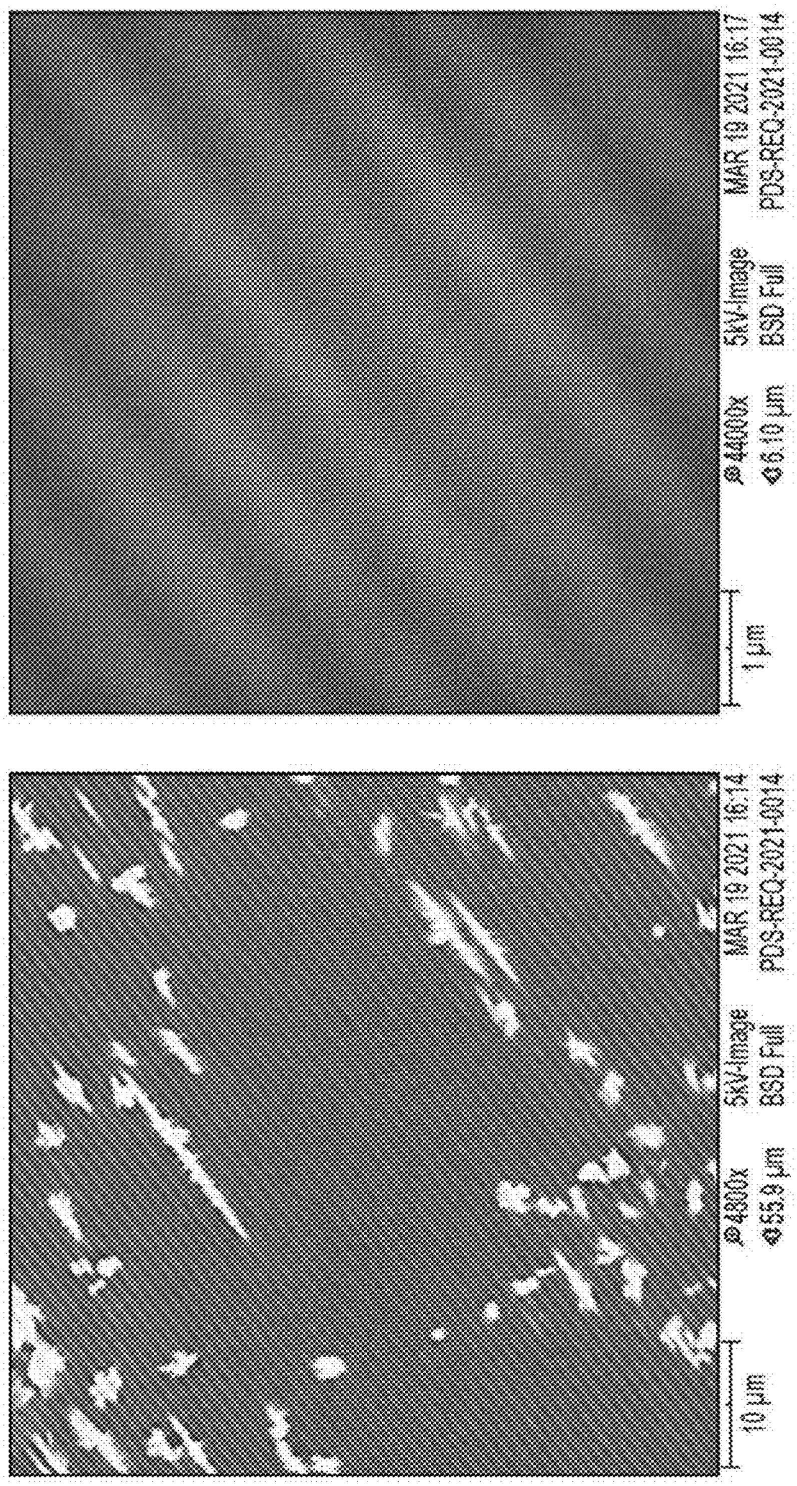

FIG. 3: is a scanning electron microscope image (4800× zoom and 44000× zoom) of a film according to the present invention described in Example 1.

Figure 4:
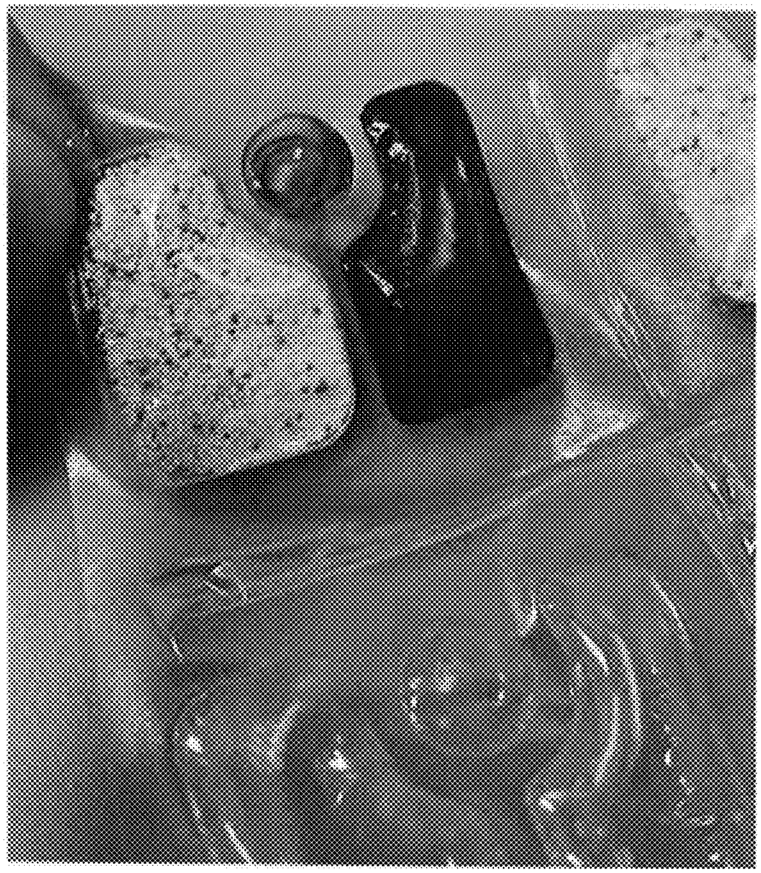

FIG. 4: is an image of a water-soluble package produced from the water-soluble film described in Example 1.

Figure 5:
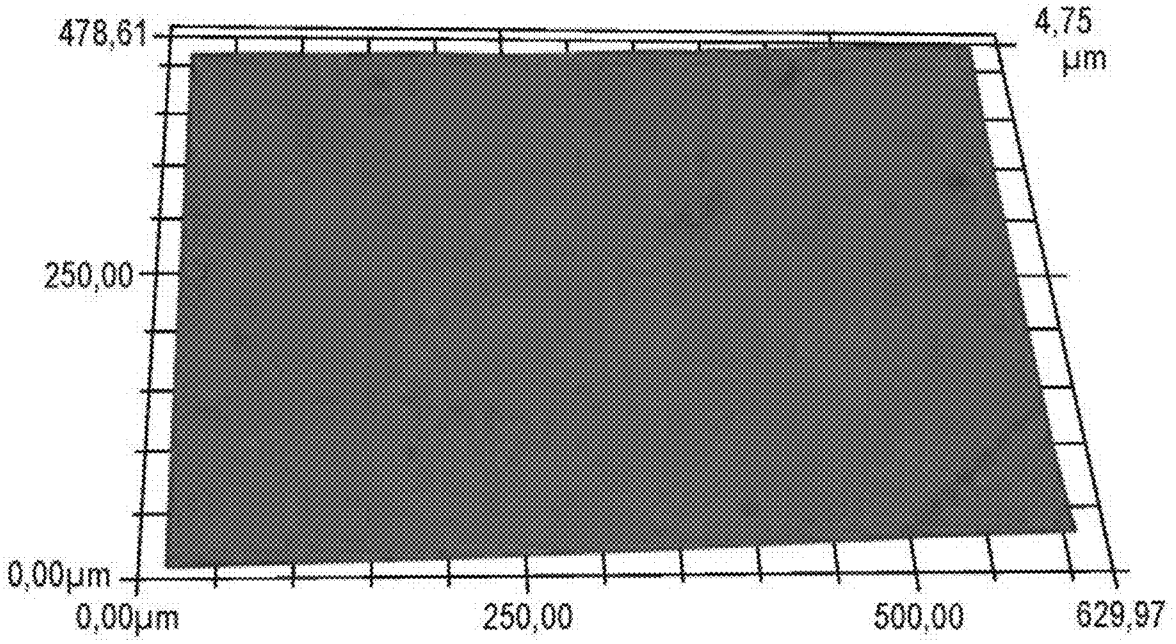

FIG. 5: is a digital microscope image (Keyence VHX-7000 with lens VHX-E100) of a film not according to the present invention described in Reference Example 2.

Figure 6:
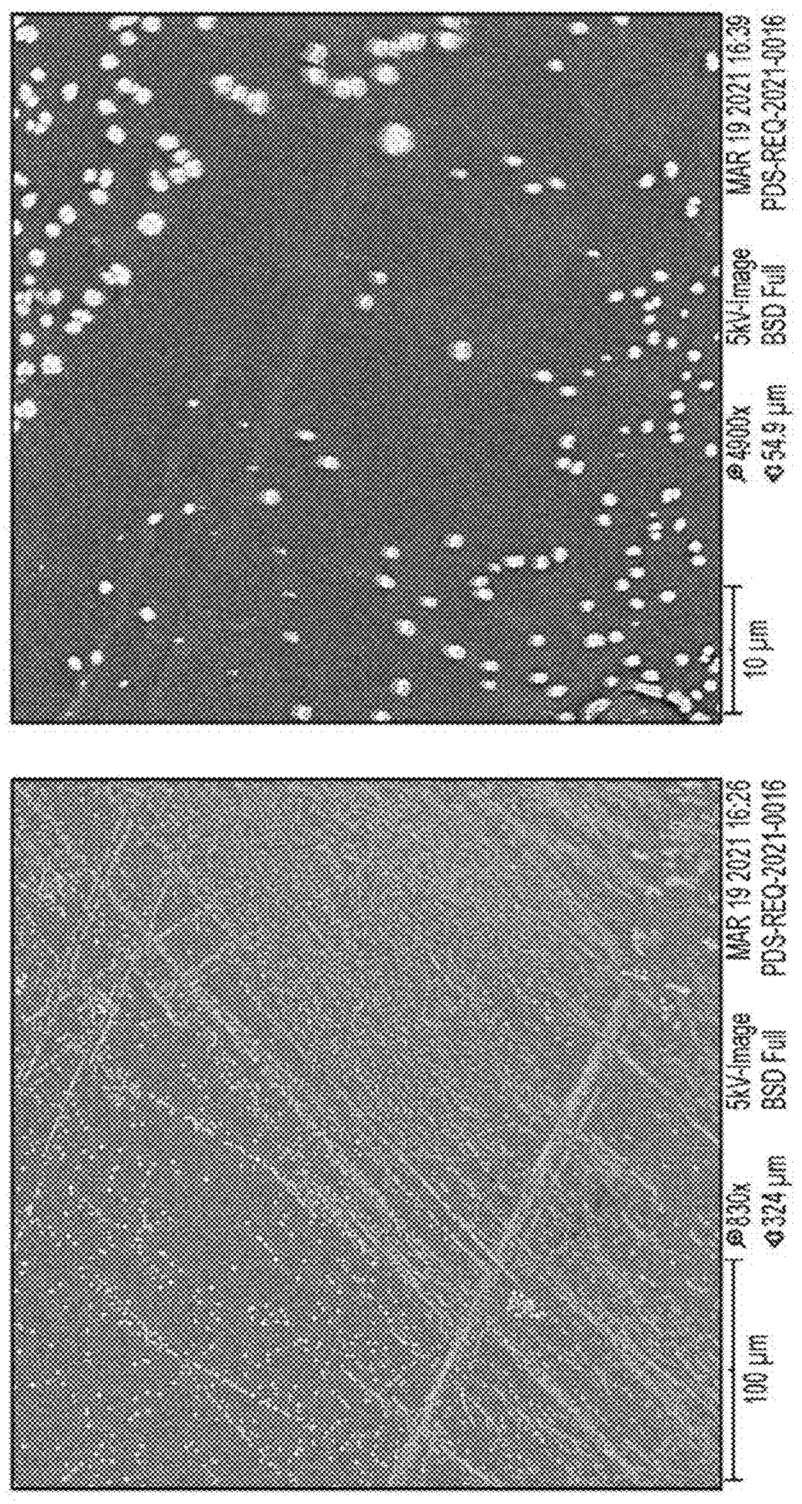

FIG. 6: is a scanning electron microscope image (830× zoom and 4500× zoom) of a film not according to the present invention described in Reference Example 2.

Figure 7:
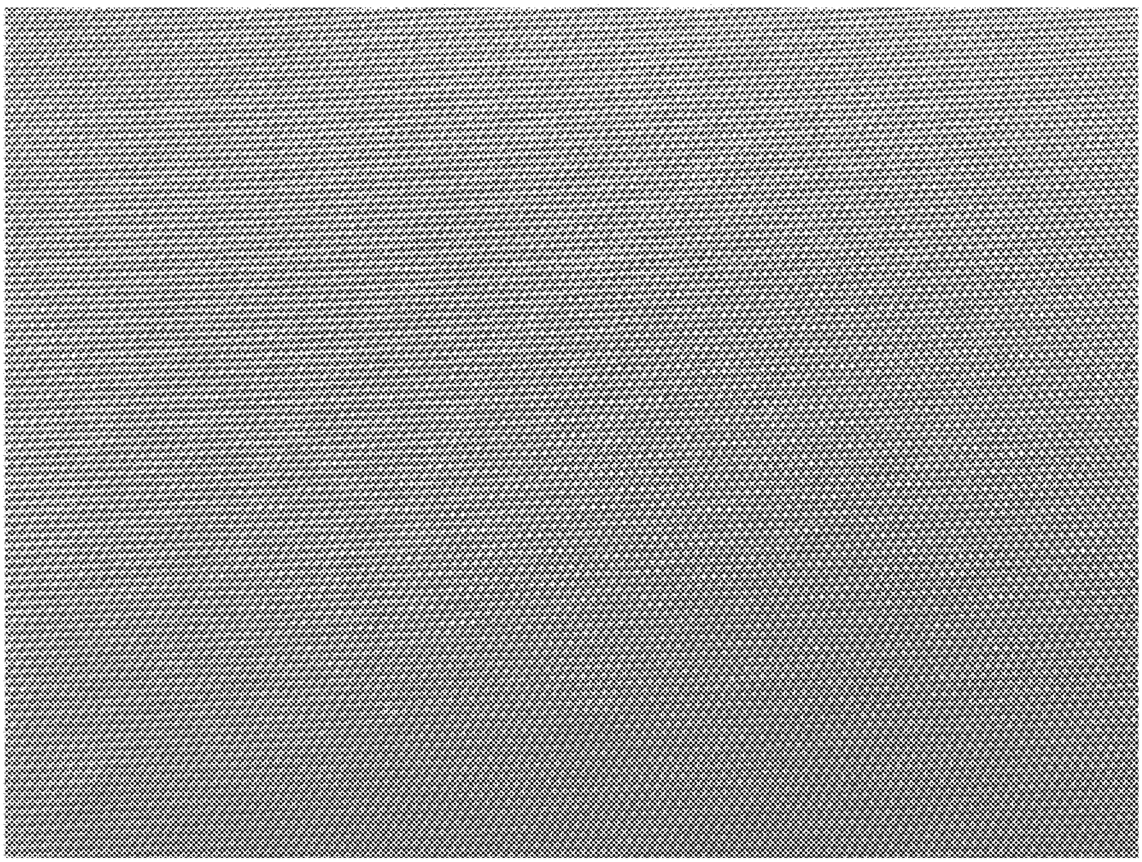

FIG. 7: is an image of the surface of a water-soluble sheet according to the present invention described in Example 3.

Figure 8:

FIG. 8: is an image of a water-soluble package produced from the water-soluble film described in Example 3.

Figure 9:
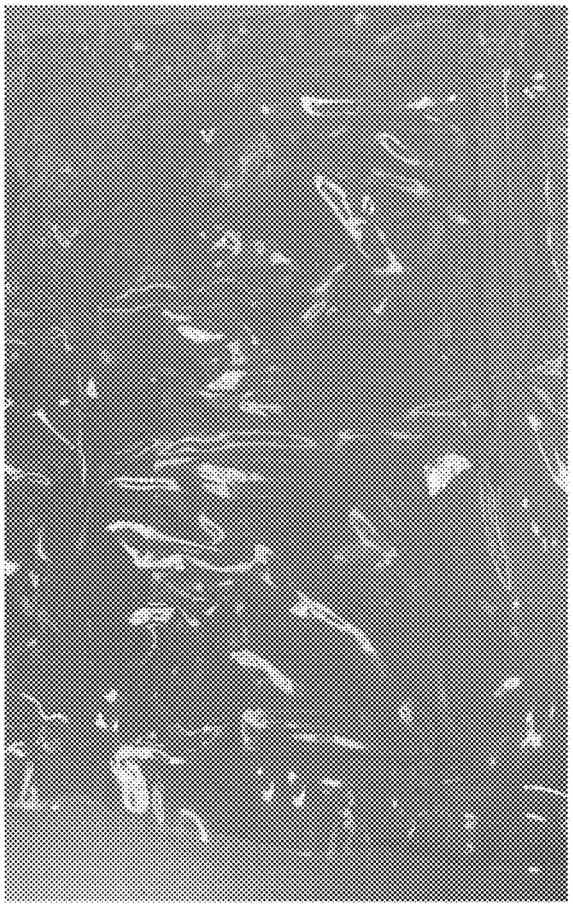

FIG. 9: is an image of a water-soluble sheet according to the present invention described in Example 4.

EXAMPLES

Example 1

5 g of PVOH film (SOLUBLON® GA film) was dissolved in 25 mL of de-ionised water to form a solution. The solution was then cast on a PET diffraction grating (SKU #01503 from Rainbow Symphony), having a surface pattern of 1000 depressions per mm, using film application device COATMASTER 510 Basic-G. The film was left to dry overnight at a temperature of 20° C. and 37% relative humidity to form a water-soluble film having a structured surface pattern. The film obtained by this process is shown in FIG. 1 (left). As shown, the film possesses iridescent colour regions.

Moreover, as shown in FIGS. 2 and 3, when viewed under a digital microscope and scanning electron microscope, the film exhibited protrusions on the surface of the film. The centre to centre distance of adjacent protrusions is around 950-1050 nm.

The film was then processed into a water-soluble package. As shown in FIG. 4, the water-soluble package exhibits iridescent colour regions.

Reference Example 2

5 g of PVOH film, (SOLUBLON® GA film) was dissolved in 25 mL of de-ionised water to form a solution. The solution was then cast on a glass surface having no structured surface pattern. The film was left to dry overnight at a temperature of 20° C. and 37% relative humidity to form a water-soluble film. The film obtained by this process is shown in FIG. 1 (right). As shown, the film does not possess any iridescent colour regions.

Moreover, as shown in FIG. 5 and FIG. 6, when viewed under a digital microscope and scanning electron microscope the film did not exhibit protrusions on the surface of the film.

Example 3

5 g of PVOH film (SOLUBLON® GA film) was dissolved in 25 mL of de-ionised water to form a solution. The solution was then cast on a PET diffraction grating (Temilux ID Pure Film in 210 μm from Temicon) and the thickness of the film was adjusted using applicator MULTICATOR 411. The film was left to dry overnight at a temperature of 20° C. and 37% relative humidity to form a PVOH film having a structured surface pattern. The film obtained by this process is shown in FIG. 7. As shown, the film possessed corresponding surface pattern and roughness.

The film was then processed into a water-soluble package. As shown in FIG. 8, the water-soluble package exhibits iridescent colour regions.

Example 4

A Collin ZK 25*42D twin screw extruder was used to prepare a melt at 185° C. from a mixture comprising 20.4% low molecular weight PVOH resin and 56.4% high molecular weight PVOH resin, 22% plasticizers and 1.2% processing aids. The melt was fed with a melt pump to a flat die for extrusions at a speed of from 5 to 15 kg/h. After extrusion the mixture was formed on 2 chrome plated Chill-Rolls to a film. The first Chill-Roll had a cooling temperature of 60° C. and the second Chill-Roll had a cooling temperature of 20° C. The first Chill-Roll had a structured surface pattern. The film was then wounded with a hall-off system to the desired thickness.

As shown in FIG. 9, the resulting water-soluble film possessed a structured surface pattern and iridescent colour regions.

Reference Example 5

A Collin ZK 25*42D twin screw extruder was used to prepare a melt at 185° C. from a mixture comprising 20.4% low molecular weight PVOH resin and 56.4% high molecular weight PVOH resin, 22% plasticizers and 1.2% processing aids. The melt was fed with a melt pump to a flat die for extrusion at a speed of from 5 to 15 kg/h. After extrusion the mixture was formed on 2 chrome plated Chill-Rolls to a film. The first Chill-Roll had a cooling temperature of 60° C. and the second Chill-Roll had a cooling temperature of 20° C. Neither Chill-Roll possessed a structured surface pattern. The film was then wounded with a hall-off system to the desired thickness.

The resulting water-soluble film did not possess a structured surface pattern and did not possess iridescent colour regions.

Mechanical Properties

Films with thickness of 90 μm were produced according to the method stated in Example 1 and Reference Example 2. The tensile and sealing properties were then tested according to ISO 527-3 and ASTM F88 on a Zwicki-Line testing machine Z1.0. The results are shown in Table 1 below.

TABLE 1

| | Maximum force/N | Elongation at break/mm | Maximum force till seal destroyed/N |
|---|---|---|---|
| Example 1 | 53.2 ± 3.1 | 199 ± 10 | 26.6 ± 0.9 |
| Reference Example 2 | 52.9 ± 5.3 | 196 ± 15 | 24.5 ± 3.2 |

From these results, it can be seen that a PVOH film having a structured surface pattern produced according to the first aspect of the present invention displays no discernible difference in tensile and sealing properties, while providing the improved aesthetic effect, as shown in FIG. 1.

In addition, films with thickness of 90 μm were produced according to the method stated in Reference Example 2 and Example 3. The coefficient of friction of these films were tested. The results are shown in Table 2 below.

TABLE 2

| | Coefficient of friction |
|---|---|
| Reference Example 2 | >10 |
| Example 3 | 1.0 |

As seen from Table 2, PVOH films having a structured surface pattern produced according to the present invention had a much lower coefficient of friction than films not produced by the present process of the invention, and thus not possessing a structured surface pattern. This indicates that the presence of a structured surface pattern may improve the clinginess of the film.

Films with thickness of 90 μm were produced according to the method stated in Example 4 and Reference Example 5. Tensile and sealing properties of these films were then tested according to ISO 527-3 and ASTM F88 on a Zwicki-Line testing machine Z1.0. The results of this test are shown in Table 3 below.

TABLE 3

| | Machine direction | | Transverse direction | | Maximum force |
|---|---|---|---|---|---|
| | Maximum force/N | Elongation at break/mm | Maximum force/N | Elongation at break/mm | till seal destroyed/N |
| Example 4 film | 89.2 ± 3.8 | 160 ± 6 | 57.3 ± 3.5 | 217 ± 8 | 44.3 ± 5.0 |
| Example 5 film | 77.9 ± 9.8 | 136 ± 15 | 52.0 ± 5.7 | 220 ± 15 | 51.8 ± 3.5 |

As shown in Table 3, PVOH films having a structured surface pattern produced according to the second aspect of the present invention display no discernible difference in tensile and sealing properties, while providing an improved aesthetic effect.

It is of course to be understood that the present invention is not intended to be restricted to the foregoing examples which are described by way of example only.

The invention claimed is:

1. A method of manufacturing a water-soluble sheet having an area of structured surface pattern, the structured surface pattern having one or more structural features having a measurement of less than 1000 μm wherein the method comprises the steps of:

a) providing a substrate having an area of complementary structured surface pattern, wherein the complementary structured surface pattern includes one or more depressions and/or protrusions;

b) depositing a solution comprising a water-soluble polymer onto the substrate; and c) drying the solution to form a water-soluble sheet comprising an area of structured surface pattern, wherein a centre to centre distance between any two adjacent depressions and/or protrusions of the complementary structured surface pattern is substantially the same as a centre to center distance between any other two adjacent depressions and/or protrusions of the complementary structured surface pattern.

2. The method according to claim 1, wherein the area of complementary structured surface pattern covers from 1-50% of the surface of at least one side of the substrate.

3. The method according to claim 1, wherein each depression is a groove, a rectangular depression, a circular depression, a cross shaped depression, or a hexagonal shaped depression.

4. The method according to claim 1, wherein each protrusion is a groove, a rectangular protrusion, a circular protrusion, a cross shaped protrusion, or a hexagonal shaped protrusion.

5. The method according to claim 1, wherein the centre to centre distance between the two adjacent depressions and/or protrusion is from 1 nm-100 μm.

6. The method according to claim 1, wherein the one or more protrusions and/or depressions are parallel.

7. The method according to claim 1, wherein the water-soluble polymer is PVOH.

8. The method according to claim 1, wherein the substrate is a metal, polymeric material, silicon, or silicon derivative.

9. The method according to claim 1, wherein the centre to centre distance between the two adjacent depressions and/or protrusions of the complementary structured surface pattern is substantially the same as the centre to centre distance between every other two adjacent depressions and/or protrusions of the complementary structured surface pattern.

10. The method according to claim 1, wherein the structured surface pattern of the water-soluble sheet is configured to diffract polychromatic light into dispersed coulors thereby providing an iridescent color region on the water-soluble sheet, and/or the structured surface pattern of the water-soluble sheet has a reduced coefficient of friction compared to a water-soluble sheet without a structure surface pattern.

11. A method of manufacturing a water-soluble sheet having an area of structured surface pattern, the structured surface pattern having one or more structural features having a measurement of less than 1000 μm, the method comprising the steps of:

a) providing a mixture comprising a water-soluble polymer;

b) extruding the mixture through a die;

c) contacting the mixture with a substrate having an area of complementary structured surface pattern, wherein the complementary structured surface pattern includes one or more depressions and/or protrusions; and d) forming a water-soluble sheet comprising an area of structured surface pattern from the mixture, wherein a centre to centre distance between any two adjacent depressions and/or protrusions of the complementary structured surface pattern is substantially the same as a centre to centre distance between any other two adjacent depressions and/or protrusions of the complementary structured surface pattern.

12. The method according to claim 11, wherein the area of complementary structured surface pattern covers from 1-50% of the surface of at least one side of the substrate.

13. The method according to claim 11, wherein each depression is a groove, a rectangular depression, a circular depression, a cross shaped depression, and/or a hexagonal shaped depression.

14. The method according to claim 11, wherein each protrusion is a groove, a rectangular protrusion, a circular protrusion, a cross shaped protrusion, or a hexagonal shaped protrusion.

15. The method according to claim 11, wherein the centre to centre distance between the two adjacent depression and/or protrusion is from 1 nm-100 μm.

16. The method according to claim 11, wherein the one or more protrusions and/or depressions are parallel.

17. The method according to claim 11, wherein the water-soluble polymer is PVOH.

18. The method according to claim 11, wherein the substrate is a metal, polymeric material, silicon, or silicon derivative.

19. The method according to claim 11, wherein the centre to centre distance between the two adjacent depressions and/or protrusions of the complementary structured surface pattern is substantially the same as the centre to centre distance between every other two adjacent depressions and/or protrusions of the complementary structured surface pattern.

20. The method according to claim 11, wherein the structured surface pattern of the water-soluble sheet is configured to diffract polychromatic light into dispersed coulors thereby providing an iridescent color region on the water-soluble sheet, and/or the structured surface pattern of the water-soluble sheet has a reduced coefficient of friction compared to a water-soluble sheet without a structure surface pattern.

* * * * *